United States Patent
Han et al.

(10) Patent No.: US 8,940,420 B2
(45) Date of Patent: Jan. 27, 2015

(54) RECHARGEABLE BATTERY

(75) Inventors: Min-Yeol Han, Yongin-si (KR);
Sang-Won Byun, Yongin-si (KR);
Hae-Kwon Yoon, Yongin-si (KR)

(73) Assignees: Samsung SDI Co., Ltd., Yongin-Si,
Gyeonggi-Do (KR); Robert Bosch GmbH, Stuttgart (DE)

( * ) Notice: Subject to any disclaimer, the term of this patent is extended or adjusted under 35 U.S.C. 154(b) by 309 days.

(21) Appl. No.: 13/343,948

(22) Filed: Jan. 5, 2012

(65) Prior Publication Data

US 2013/0084471 A1    Apr. 4, 2013

Related U.S. Application Data

(60) Provisional application No. 61/540,692, filed on Sep. 29, 2011.

(51) Int. Cl.
| | |
|---|---|
| *H01M 14/00* | (2006.01) |
| *H01M 2/04* | (2006.01) |
| *H01M 2/30* | (2006.01) |
| *H01M 2/34* | (2006.01) |
| *H01M 10/0525* | (2010.01) |

(52) U.S. Cl.
CPC .............. *H01M 2/043* (2013.01); *H01M 2/307* (2013.01); *H01M 2/348* (2013.01); *H01M 10/0525* (2013.01); *Y02T 10/7011* (2013.01)
USPC .................................. 429/7; 429/211; 429/209

(58) Field of Classification Search
CPC ......... H01M 2/04; H01M 2/34; H01M 10/42; H01M 10/4235; H01M 2/043; H01M 2/307; H01M 2/348; H01M 10/0525; Y02T 10/7011; Y02E 60/12
USPC ..................................................... 429/7, 211
See application file for complete search history.

(56) References Cited

U.S. PATENT DOCUMENTS

| | | | |
|---|---|---|---|
| 2004/0092167 A1* | 5/2004 | Barrault et al. ............... | 439/621 |
| 2011/0183193 A1* | 7/2011 | Byun et al. .................... | 429/178 |
| 2012/0282502 A1* | 11/2012 | Kim ............................... | 429/82 |

FOREIGN PATENT DOCUMENTS

| | | |
|---|---|---|
| EP | 0313405 A1 | 4/1989 |
| EP | 2287942 A1 | 2/2011 |
| EP | 2348558 A1 | 7/2011 |
| JP | 2003-197178 A | 7/2003 |
| JP | 2003 197178 A | 7/2003 |
| KR | 10-1999-0031054 U | 7/1999 |
| WO | WO 02/071510 A1 | 9/2002 |

OTHER PUBLICATIONS

European Search Report dated Dec. 14, 2012.

* cited by examiner

*Primary Examiner* — Gary Harris
(74) *Attorney, Agent, or Firm* — Lee & Morse, P.C.

(57) ABSTRACT

A battery includes an electrode assembly including a first electrode and a second electrode, a first electrode terminal, and a first current collecting member electrically connecting the first electrode terminal and a first electrode uncoated region of the first electrode. The first current collecting member includes a first terminal connection region, a side plate extending downwardly from the first terminal connection region towards the first electrode uncoated region, a first current collecting piece extending from the side plate, the first current collecting piece being in contact with the first electrode uncoated region, and a fuse between the side plate and the first current collecting piece.

19 Claims, 10 Drawing Sheets

RECHARGEABLE BATTERY

CROSS-REFERENCE TO RELATED APPLICATION

The present application claims priority under 35 U.S.C. §119(e) to U.S. Provisional Application No. 61/540,692, filed on Sep. 29, 2011, and entitled: "Rechargeable Battery," which is incorporated herein by reference in its entirety.

BACKGROUND

1. Field

The described technology relates generally to a rechargeable battery and, more particularly, to a rechargeable battery including a current collecting member having an improved structure.

2. Description of the Related Art

Unlike a primary battery, which cannot be recharged, a rechargeable battery can be recharged and discharged. Small-capacity rechargeable batteries are used for small portable electronic devices, e.g., mobile phones, notebook computers, camcorders, and the like, while large-capacity rechargeable batteries are used as a motor-driving power source for a hybrid vehicle, and the like.

Recently, a high-output rechargeable battery using a non-aqueous electrolyte of high energy density has been developed. A large-capacity battery module may include a plurality of high-output rechargeable batteries connected in series. Such rechargeable batteries may have a cylindrical shape, an angular shape, or the like. The large-capacity battery module may be used for applications that require a lot of power, e.g., driving a motor of a device, such as an electric automobile or the like.

When an overcurrent flows within the rechargeable battery having a case made of a material, e.g., metal, or the like, the temperature of the rechargeable battery is increased and may ignite. Also, when internal pressure of the rechargeable battery is increased due to decomposition of an electrolyte within the rechargeable battery due to the overcurrent, the rechargeable battery may explode.

The above information disclosed in this Background section is only for enhancement of understanding of the background of the described technology and therefore it may contain information that does not form the prior art that is already known in this country to a person of ordinary skill in the art.

SUMMARY

The described technology has been made in an effort to provide a rechargeable battery with improved stability.

An embodiment is directed to a battery that includes an electrode assembly including a first electrode and a second electrode, a first electrode terminal, and a first current collecting member electrically connecting the first electrode terminal and a first electrode uncoated region of the first electrode. The first current collecting member may include a first terminal connection region, a side plate extending downwardly from the first terminal connection region towards the first electrode uncoated region, a first current collecting piece extending from the side plate, the first current collecting piece being in contact with the first electrode uncoated region, and a fuse between the side plate and the first current collecting piece.

The first terminal connection region, the side plate, the first current collecting piece, and the fuse may be formed of a same material.

The first terminal connection region, the side plate, the first current collecting piece, and the fuse may be integral with one another.

The fuse may have a smaller sectional area than adjacent portions of the side plate and the first current collecting piece.

At least two first current collecting pieces may extend laterally from the side plate.

The battery may include a plurality of electrode assemblies and a corresponding plurality of first current collecting pieces. The fuse may include first and second fuse regions between the side plate and two first current collecting pieces of the plurality of first current collecting pieces, respectively.

The first and second fuse regions may extend laterally between the side plate and the two first current collecting pieces.

The battery may include a third fuse region extending vertically from the side plate, the third fuse region being between the side plate and first current collecting pieces other than the two first current collecting pieces.

The third fuse region may contact a connection region extending laterally between first current collecting pieces other than the two first current collecting pieces.

The battery may include connection regions connecting the two first current collecting pieces to adjacent first current collecting pieces, respectively.

The battery may include a connection region extending vertically from the side plate and a third fuse region extending laterally from the connection region, the third fuse region being between the connection region and a third first current collecting piece.

The battery may include a fourth fuse region extending laterally from the connection region, on a side opposite the third fuse region, the fourth fuse region being between the connection region and a fourth first current collecting piece.

The fuse may include a fuse region in an electrical path between each current collecting piece and the side plate.

The plurality of first current collecting pieces may be two current collecting pieces.

The battery may include a short circuit member connected to the first electrode terminal.

The first current collecting piece may be welded to the first electrode uncoated region.

The blocking member may be made of an electrically insulating material and at least partially surrounding the fuse.

The blocking member may include a base region on a side of the fuse opposite the electrode uncoated region and protrusions between the first terminal connection region and the first current collecting piece.

The battery may include a second electrode terminal, a second current collecting member electrically connecting the second electrode terminal and a second electrode uncoated region of the second electrode, and safety members on lateral sides of the electrode assembly and electrically connected to the second electrode.

Each safety member may include a conductive plate, an insulating region separating the conductive plate and the electrode assembly, and an electrode connection region electrically connecting the conductive plate and the second electrode, wherein the electrode connection region is welded to the second electrode.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Figure 1:
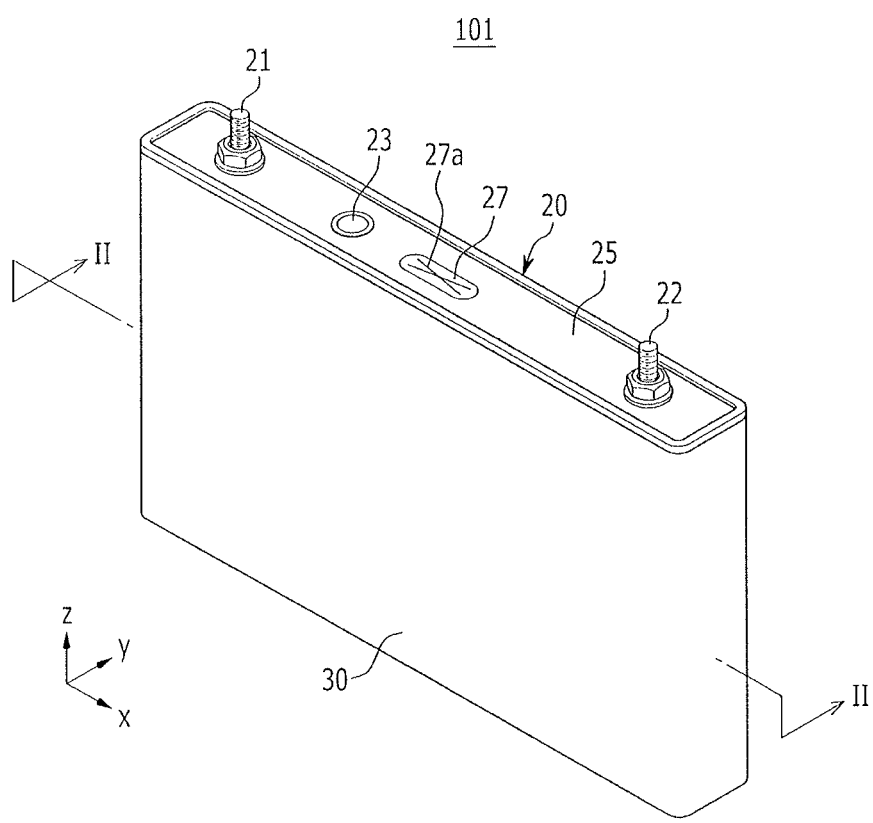
FIG. 1 illustrates a perspective view of a rechargeable battery according to a first embodiment.

Exemplary embodiments will now be described in detail such that those can be easily carried out by a person skilled in the art with reference to the accompanying drawings. As those skilled in the art would realize, the described embodiments may be modified in various different ways, all without departing from the spirit or scope of the present invention. Like reference numerals designate like elements throughout the specification.

Figure 2:
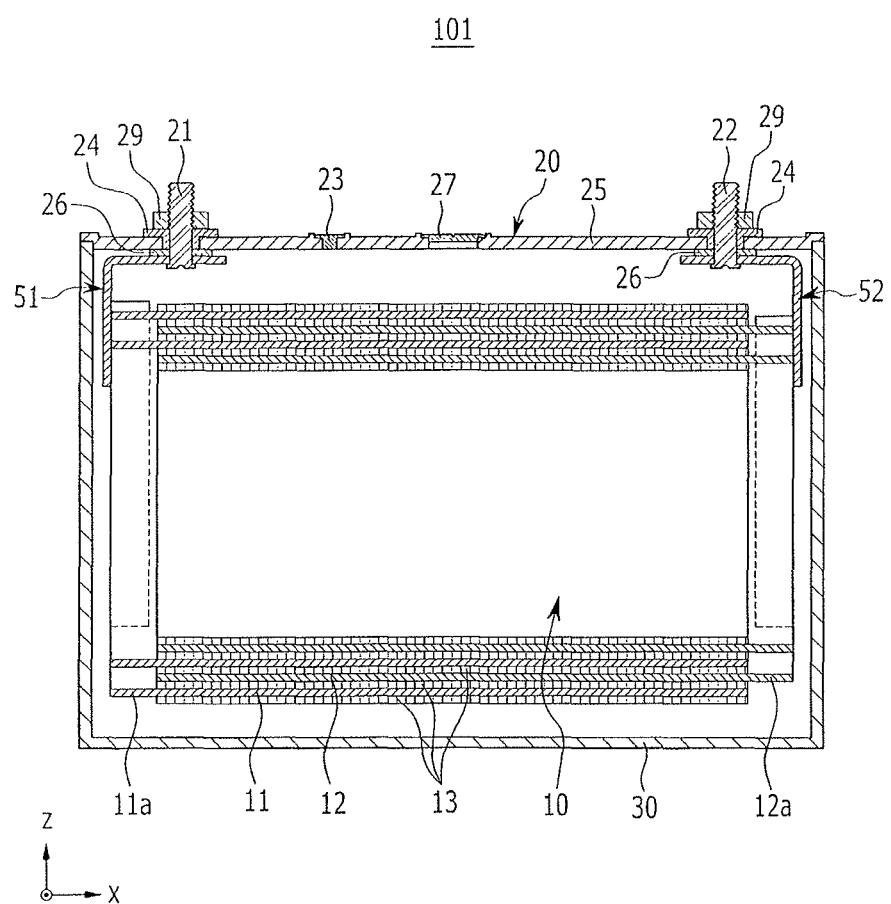
FIG. 2 illustrates a sectional view taken along line II-II in FIG. 1.

FIG. 1 illustrates a perspective view of a rechargeable battery according to a first embodiment. FIG. 2 illustrates a sectional view taken along line II-II in FIG. 2.

With reference to FIGS. 1 and 2, a rechargeable battery 100 according to the first exemplary embodiment may include an electrode assembly 10 formed by winding a positive electrode 11 and a negative electrode 12 with a separator 13 interposed therebetween, a case 30 accommodating the electrode assembly 10 therein, and a cap assembly 20 coupled to an opening of the case 30.

In the first exemplary embodiment, for example, the rechargeable battery 100 is a lithium ion rechargeable battery in a square shape. However, without being limited, the present embodiment may be applicable to various types of batteries, e.g., a lithium polymer battery, a cylindrical battery, and the like.

The positive electrode 11 and the negative electrode 12 may include coated regions of a collector formed as a thin metal foil on which an active material is coated and uncoated regions 11a and 12a on which the active material is not coated, respectively.

The positive electrode uncoated region 11a may be formed at one lateral end of the positive electrode 11 along a lengthwise direction of the positive electrode 11, and the negative electrode uncoated region 12a may be formed at the other lateral end of the negative electrode 12 along a lengthwise direction of the negative electrode 12. The positive electrode 11 and the negative electrode 12 may be wound with a separator 13, which is an insulator, interposed therebetween.

However, embodiments are not limited thereto. For example, the electrode assembly 10 may have a structure in which positive and negative electrodes configured as a plurality of sheets are alternately stacked with a separator interposed therebetween.

The case 30 may have a shape of a substantially rectangular parallelepiped and may have an opening at one side thereof. The cap assembly 20 may include a cap plate 25 covering the opening of the case 30, a positive electrode terminal 21 outwardly protruded from the cap plate 25 and electrically connected with the positive electrode 11, a negative electrode terminal 22 outwardly protruded from the cap plate 25 and electrically connected with the negative electrode 12, and a vent member 27 with a notch 27a formed to be fractured at a pre-set internal pressure.

The cap plate 25 may be formed as a thin plate and may include an electrolyte injection hole formed at one side thereof. A sealing stopper 23 for sealing the electrolyte injection hole may be fixedly installed on the cap plate 25.

The positive electrode terminal 21 may be installed in a penetrative manner on the cap plate 25. A first gasket 24 positioned at an upper side and an underlying second gasket 26, positioned between the cap plate 25 and the positive electrode terminal 21, insulate the cap plate 25 and the positive electrode terminal 21.

The positive electrode terminal 21 may have a cylindrical shape. A nut 29 may be installed on the positive electrode terminal 21 to support the positive electrode terminal 21 at an upper side. A thread may be formed on an outer circumference of the positive electrode terminal 21 to allow the nut 29 to be fastened thereto.

The positive electrode terminal 21 is electrically connected with the positive electrode uncoated region 11a by the medium of a current collecting member 51. A terminal flange supporting the positive electrode terminal 21 and the current collecting member 51 is formed at a lower end of the positive electrode terminal 21.

The negative electrode terminal 22 may be installed in a penetrative manner on the cap plate 25. The first gasket 24 positioned at an upper side and the underlying second gasket 26, positioned between the cap plate 25 and the negative electrode terminal 22, insulate the cap plate 25 and the positive electrode terminal 22.

The negative electrode terminal 22 may have a cylindrical shape. The nut 29 may be installed on the negative electrode terminal 22 to support the negative electrode terminal 22 at an upper side. A thread may be formed on an outer circumference of the negative electrode terminal 22 to allow the nut 29 to be fastened thereto.

The negative electrode terminal 22 may be electrically connected with the negative electrode uncoated region 12a by the medium of a current collecting member 52. A terminal flange supporting the negative electrode terminal 22 and the current collecting member 52 may be formed at a lower end of the negative electrode terminal 22.

Figure 3:
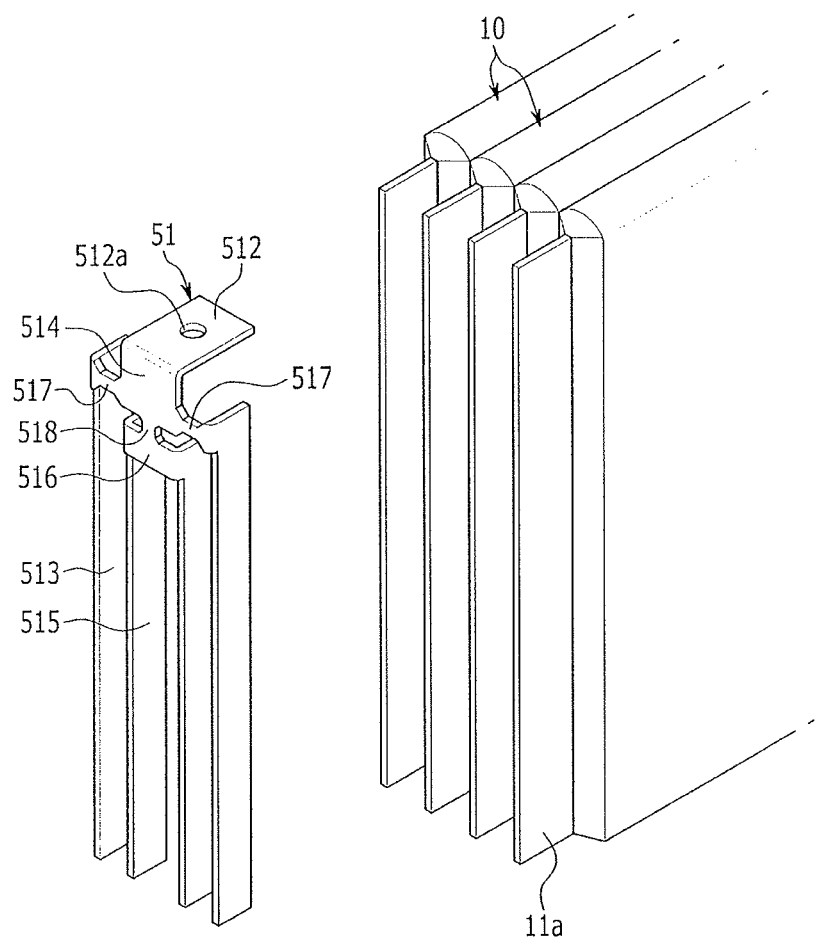
FIG. 3 illustrates a partial exploded perspective view of the rechargeable battery according to the first embodiment.

FIG. 3 illustrates a partial exploded perspective view of the rechargeable battery according to the first embodiment.

The current collecting member 51 may include a terminal connection region 512, a side plate 514 formed to be bent from the terminal connection region 512, a current collecting piece 515 fixed to the positive electrode uncoated region 11a, and fuse regions 517 formed between the side plate 514 and the current collecting piece 515 and having a small sectional area compared with the vicinity.

The current collecting member 52 installed at the negative electrode terminal 22 is configured to have the same structure as that of the current collecting member 51, except for fuse regions 517 and 518, so a description thereof will not be repeated.

The terminal connection region 512 may have a quadrangular plate-like shape and may include a hole 512a formed at the center thereof, into which the positive electrode terminal 21 is inserted. The terminal connection region 512 may be connected to a lower portion of the positive electrode terminal 21 through welding. The side plate 514 may be bent toward the bottom of the case 30 from the terminal connection region 512 at a right angle so as to be disposed to be parallel to the side of the case 30.

Two current collecting pieces 513 may be connected to both lateral ends of the side plate 514. The current collecting pieces 513 may have a shape of a long quadrangular plate and may be connected to the positive electrode uncoated region 11a through welding.

Fuse regions 517 having a smaller sectional area than other portions may be formed between the current collecting pieces 513 and the side plate 514. According to the present embodiment, the fuse regions 517 are formed to have a smaller width than the vicinity. Accordingly, when an overcurrent flows through the current collecting member 51, the fuse regions 517 may be melted to cut off an electrical connection between the current collecting piece 513 and the side plate 514. However, the present embodiment is not meant to be limited thereto. For example, any manner of realizing fuses have a smaller sectional area than the vicinity may be used, e.g., the fuse regions 517 may have a smaller thickness than the vicinity.

A connection region 516 is formed at a lower portion of the side plate 514, and a fuse region 518 having a smaller sectional area than other portions is formed between the connection region 516 and the side plate 514. Current collecting pieces 515 are formed at both lateral ends of the connection region 516 and connected to the positive electrode uncoated region 11a through welding.

When the fuse region 518 has a smaller width than the vicinity and an overcurrent flows through the current collecting member 51, the fuse region 518 is melted to cut off an electrical connection between the side plate 514 and the connection region 516.

In this manner, according to the present embodiment, since the plurality of fuse regions 517 are formed to be connected to the side plate 514, when an overcurrent flows, an electrical connection with the respective current collecting pieces 513 can be cut off. Also, since the fuse region 518 is formed between the side plate 514 and the connection region 516, an electrical connection between the side plate 514 and the connection region 516 can be cut off.

When a plurality of electrode assemblies 10 are insertingly installed and are connected in parallel to each other within the case 30, if the respective electrode assemblies are not blocked, a high capacity current would continuously flow between the electrode assemblies 10, resulting in a dangerous situation. In this case, the continuous flow of current will increase the internal pressure within the case 30, which may cause an explosion or ignition.

However, according to the present embodiment, when the current collecting pieces 513 and 515 connected to the side plate 514 are blocked, respectively, the capacity of current stored in the electrode assemblies 10 is distributed, enhancing stability.

Figure 4:
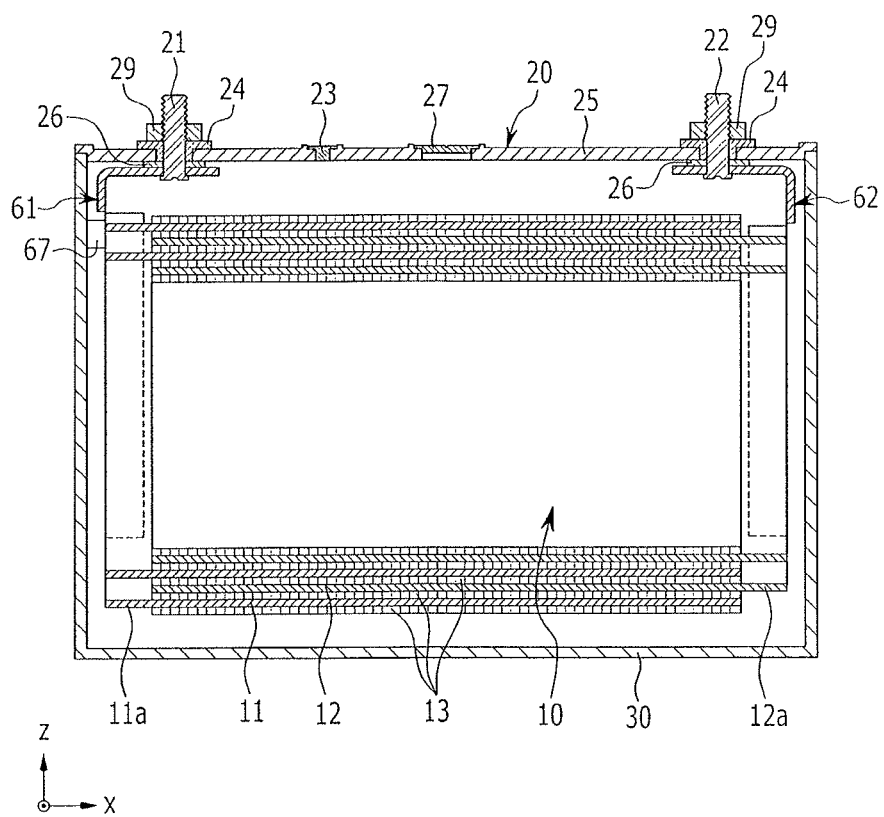
FIG. 4 illustrates a sectional view of a rechargeable battery according to a second embodiment.
Figure 5:
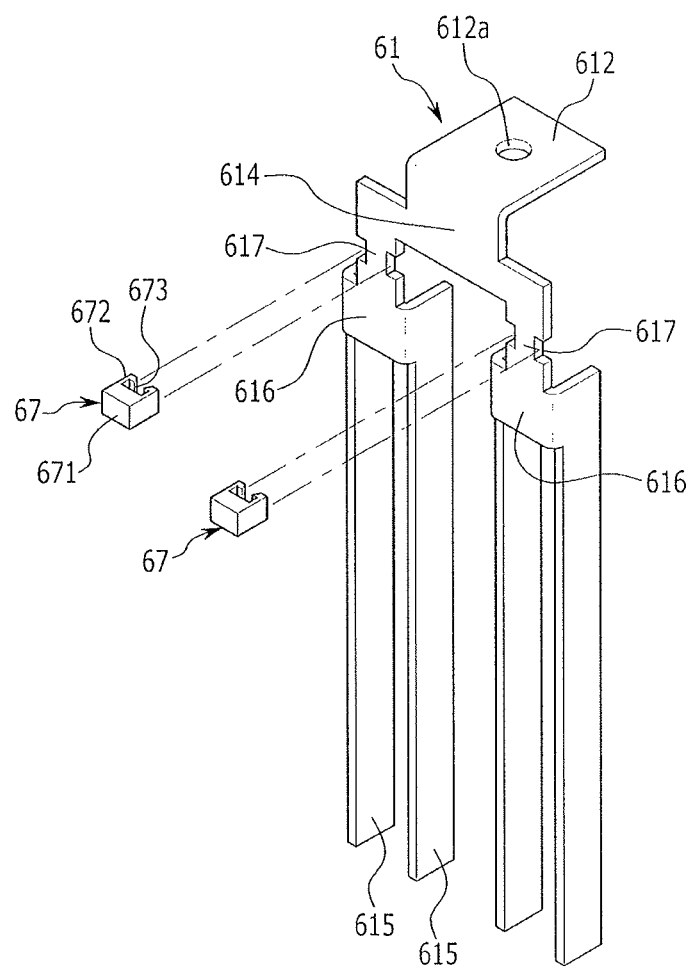
FIG. 5 illustrates a perspective view of a current collecting member of the rechargeable battery according to the second embodiment.

FIG. 4 illustrates a sectional view of a rechargeable battery according to a second embodiment. FIG. 5 illustrates a perspective view of a current collecting member of the rechargeable battery according to the second embodiment.

A rechargeable battery 102 according to a second embodiment is configured to have the same structure as that of the first embodiment as described above, except for the structure of the current collecting member 61, so a description of the same structure will not be repeated.

With reference to FIGS. 4 and 5, the rechargeable battery 102 according to the second embodiment may include the electrode assembly 10, the positive electrode terminal 21, the negative electrode terminal 22, a current collecting member 61 electrically connecting the positive electrode terminal 21 and the electrode assembly 10, and a current collecting member 62 electrically connecting the negative electrode terminal 22 and the electrode assembly 10.

The current collecting member 61 may include a terminal connection region 612 fixed to the positive electrode terminal 21, a side plate 614 formed to be bent from the terminal connection region 612, two connection regions 616 connected to a lower portion of the side plate 614, and current collecting pieces 615 connected to both lateral ends of the connection regions 616 and attached to the positive electrode uncoated region 11a. Fuse regions 617 having a smaller sectional area than the vicinity may be formed between the side plate 614 and the connection regions 616 and 616.

The current collecting member 62 may be configured to have the same structure as that of the current collecting member 61, except for the fuse regions 617, so a description thereof will not be repeated.

The terminal connection region 612 may have a quadrangular plate-like shape and may include a hole 612a at the center thereof, into which the positive electrode terminal 21 is inserted. The terminal connection region 612 may be connected to a lower portion of the positive electrode terminal 21 through welding. The side plate 614 may be bent toward the bottom of the case 30 from the terminal connection region 612 at a right angle so as to be disposed to be parallel to the side of the case 30.

Two connection regions 616 may be separately connected to lower end portions of the side plate 614. The fuse regions 617 having a smaller sectional area than other portions may be formed between the connection regions 616 and the side plate 614. Current collecting pieces 615 may be formed at both lateral ends of each of the connection regions 616 and connected to the positive electrode uncoated region 11a through welding.

According to the present embodiment, the fuse regions 617 have a smaller width than the vicinity. Accordingly, when an overcurrent flows through the current collecting member 61, the fuse regions 617 may be melted to cut off an electrical connection between the connection region 616 and the side plate 614. However, the present embodiment is not meant to be limited thereto, e.g., the fuse regions 617 may have a smaller thickness than the vicinity.

When a plurality of electrode assemblies 10 are insertingly installed and connected in parallel within the case 30, if the respective electrode assemblies are not blocked, a high capacity current would continuously flow between and among the electrode assemblies 10, which may result in a dangerous situation. In this case, the continuous flow of current will increase the internal pressure within the case 30, which may cause an explosion or ignition.

However, according to the present embodiment, when the connection regions 616 connected to the side plate 614 are blocked, respectively, the capacity of current stored in the electrode assemblies 10 is distributed, enhancing stability.

A blocking member 67 may be insertingly installed on each of the fuse regions 617 and 617. The blocking member 67 may be made of a material having electrical insulation properties, e.g., a polymer or the like. The blocking member 67 may include a base region 671, projections 672 protruding from both lateral ends of the base region 671, and a stopping protrusion 673 at a front end of the projections 672 and protruding inwardly. The projections 672 are inserted into recesses formed on the fuse regions 617, while the stopping protrusion 673 is in contact with the fuse region 617, supporting the blocking member 67.

The base region 671 may be positioned between the case 30 and the current collecting member 61 to insulate the current collecting member 61 and the case 30. When the fuse regions 617 are melted, the projections 672 support such that the melted portions are separated. Accordingly, after the fuse regions 617 are melted, the separated portions can be prevented from coming back into contact.

When the fuse regions 617 are melted, if the separated portions are sufficiently close, a fire or the like may spark at the separated portions and the rechargeable battery 102 may ignite. However, according to the present embodiment, since the blocking member 67 is installed, the gap between the separated portions of the fuse regions 617 may be stably maintained.

Figure 6:
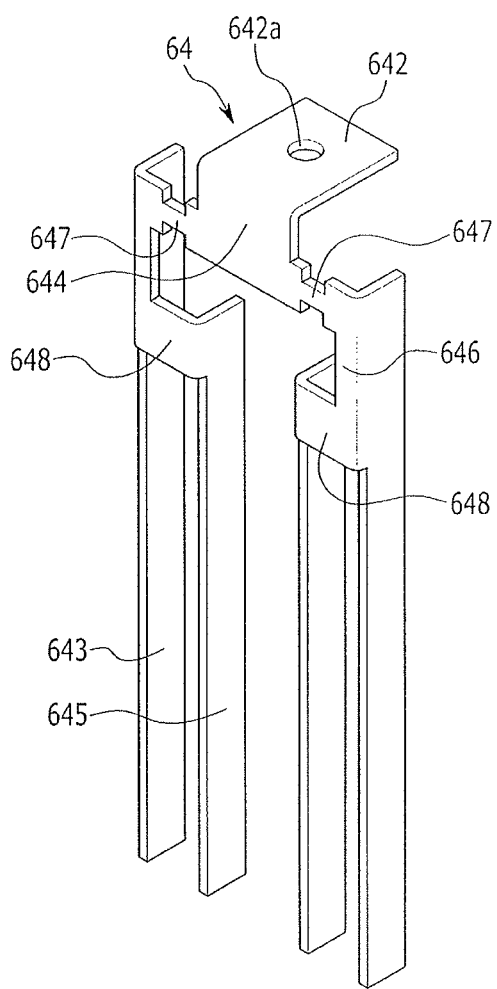
FIG. 6 illustrates a perspective view of a current collecting member of a rechargeable battery according to a third embodiment.

FIG. 6 illustrates a perspective view of a current collecting member of a rechargeable battery according to a third embodiment.

With reference to FIG. 6, a rechargeable battery according to the third embodiment is configured to have the same structure as that of the first embodiment, except for the structure of a current collecting member, so a description of the same structure will not be repeated.

A current collecting member 64 according to the third embodiment may include a terminal connection region 642 fixed to the positive electrode terminal 21, a side plate 644 formed to be bent from the terminal connection region 642, two connection regions 646 connected to both lateral ends of the side plate 644, and current collecting pieces 643 formed at lower portions of the connection regions 646 and attached to the positive electrode uncoated region 11a. Fuse regions 647 having a smaller sectional area than the vicinity may be formed between the side plate 644 and the connection regions 646.

The terminal connection region 642 may have a quadrangular plate-like shape and may include a hole 642a at the center thereof, into which the positive electrode terminal 21 is inserted. The terminal connection region 642 may be connected to a lower portion of the positive electrode terminal 21 through welding. The side plate 644 may be bent toward the bottom of the case 30 from the terminal connection region 642 at a right angle so as to be disposed to be parallel to the side of the case 30.

Connection regions 646 may be connected with both lateral ends of the side plate 644. A current collecting piece 643 may be formed at a lower portion of the connection region 646 and attached to the positive electrode uncoated region 11a. Branch regions 648 may protrude from lateral ends of the connection regions 646. Current collecting pieces 645 may be connected to the branch regions 648.

Fuse regions 647, each having a smaller sectional area than other portions, may be formed between the connection regions 646 and the side plate 644. According to the present embodiment, the fuse regions 647 have a smaller width than the vicinity. Accordingly, when an overcurrent flows through the current collecting member 64, the fuse regions 647 may be melted to cut off an electrical connection between the connection regions 646 and the side plate 644. However, the present embodiment is not meant to be limited thereto, e.g., the fuse regions 647 may have a smaller thickness than the vicinity.

When a plurality of electrode assemblies 10 are insertingly installed and connected in parallel within the case 30, if the respective electrode assemblies are not blocked, a high capacity current would continuously flow between and among the electrode assemblies 10, which may result in a dangerous situation. In this case, the continuous flow of current will increase the internal pressure within the case 30, which may cause an explosion or ignition.

However, according to the present embodiment, when the connection regions 646 connected to the side plate 644 are blocked, respectively, the capacity of current stored in the electrode assemblies 10 is distributed, enhancing stability.

Figure 7:
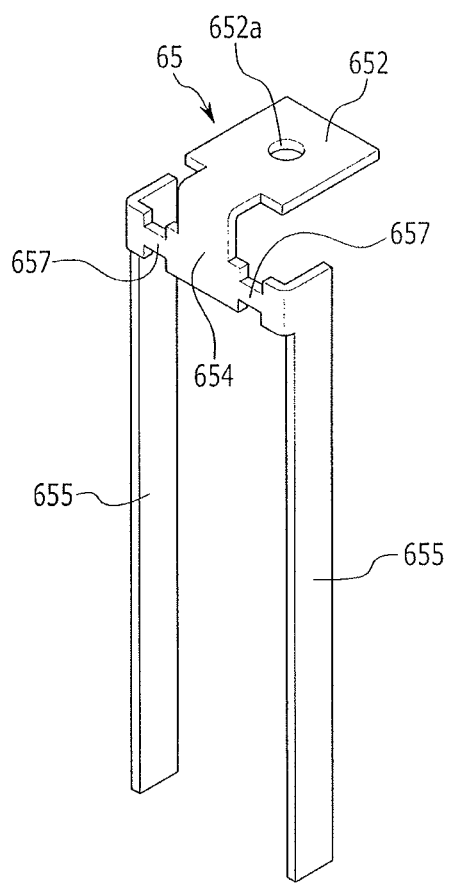
FIG. 7 illustrates a perspective view of a current collecting member of a rechargeable battery according to a fourth embodiment.

FIG. 7 illustrates a perspective view of a current collecting member of a rechargeable battery according to a fourth embodiment.

With reference to FIG. 7, a rechargeable battery according to a fourth embodiment is configured to have the same structure as that of the first embodiment, except for the number of the electrode assemblies, so a description of the same structure will not be repeated.

The current collecting member 65 of the rechargeable battery according to the fourth embodiment may include a terminal connection region 652 fixed to the positive electrode terminal 21, a side plate 654 formed to be bent from the terminal connection region 652, current collecting pieces 655 connected to both lateral ends of the side plate 654, and fuse regions 657 between the side plate 654 and the current collecting pieces 655.

The terminal connection region 652 may have a quadrangular plate-like shape and may include a hole 652a at the center thereof, into which the positive electrode terminal 21 is inserted. The terminal connection region 652 may be connected to a lower portion of the positive electrode terminal 21 through welding. The side plate 654 may be bent toward the bottom of the case 30 from the terminal connection region 512 at a right angle so as to be disposed to be parallel to the side of the case 30.

Fuse regions 657 having a smaller sectional area than other portions may be formed at both lateral ends of the side plate 654. According to the present embodiment, the fuse regions 657 are formed to have a smaller width than the vicinity. Accordingly, when an overcurrent flows through the current collecting member 65, the fuse regions 657 may be melted to cut off an electrical connection between the current collecting pieces 655 and the side plate 654. However, the present embodiment is not meant to be limited thereto, e.g., the fuse regions 657 may be formed to have a smaller thickness than the vicinity.

Current collecting pieces 655 may be formed at one lateral end of each of the fuse regions 657 and connected to the positive electrode uncoated region 11a through welding.

When two electrode assemblies 10 are insertingly installed and connected in parallel within the case 30, if the respective electrode assemblies are not blocked, a high capacity current would continuously flow between the electrode assemblies 10, which may result in a dangerous situation. In this case, the continuous flow of current will increase the internal pressure within the case 30, which may cause an explosion or ignition.

However, according to the present embodiment, when the current collecting pieces 655 connected to the side plate 654 are blocked, respectively, the capacity of current stored in the electrode assemblies 10 is distributed, enhancing stability.

Figure 8:
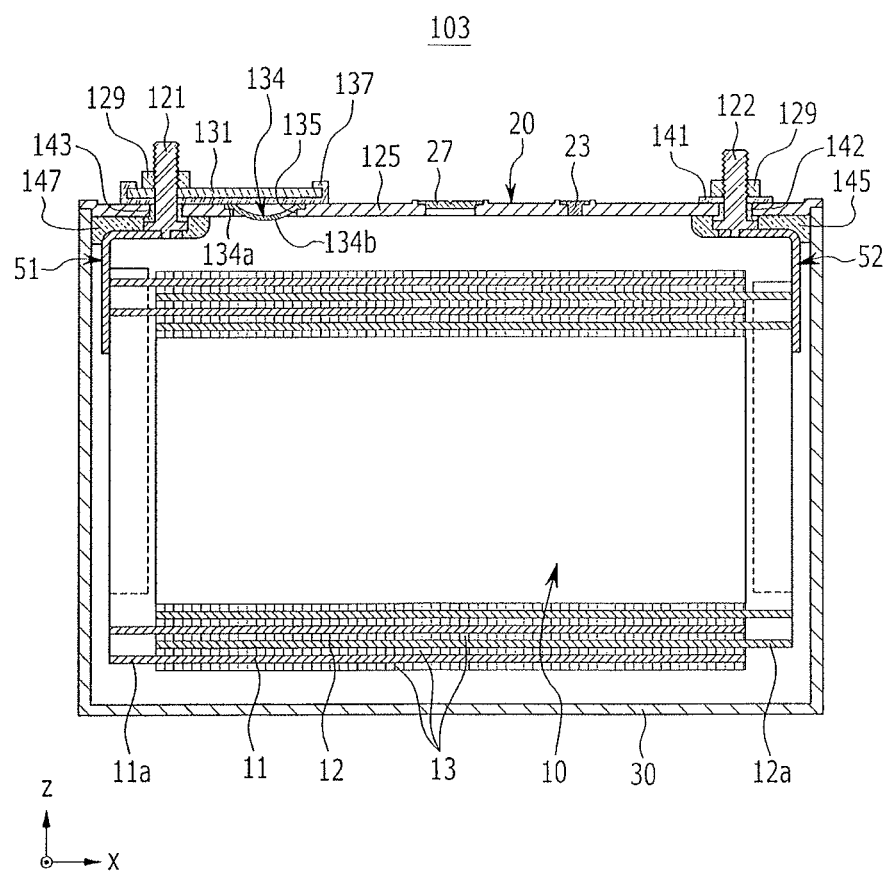
FIG. 8 illustrates a sectional view of a rechargeable battery according to a fifth embodiment.

FIG. 8 illustrates a sectional view of a rechargeable battery according to a fifth embodiment.

With reference to FIG. 8, a rechargeable battery 103 according to the fifth exemplary embodiment may include an electrode assembly 10 formed by winding the positive electrode 11 and the negative electrode 12 with the separator 13 interposed therebetween, the case 30 accommodating the electrode assembly 10 therein, and a cap assembly 120 coupled to an opening of the case 30. The electrode assembly 10 is configured to have the same structure as that of the first embodiment as described above.

The case 30 may have a shape of a substantially rectangular parallelepiped, and has an opening at one side thereof. The cap assembly 120 may include a cap plate 125 covering the opening of the case 30, a positive electrode terminal 121 outwardly protruded from the cap plate 125 and electrically connected with the positive electrode 11, and a negative electrode terminal 122 outwardly protruded from the cap plate 125 and electrically connected with the negative electrode 12.

The positive electrode terminal 121 may be electrically connected with the positive electrode uncoated region 11a via the current collecting member 51. The current collecting member 51 may be configured to have the same structure as that of the current collecting member according to the first embodiment.

Between the positive electrode terminal 121 and the cap plate 125, a gasket 143 may be insertingly positioned in a hole into which the positive electrode terminal 121 penetrates. A lower insulating member 147 may be installed under the cap plate 125 to insulate portions of the positive electrode terminal 121 and the current collecting member 51 inserted therein from the cap plate 125.

A short-circuit tab 131 may be electrically connected to the positive electrode terminal 121, e.g., the short-circuit tab 131 is installed on the cap plate 125. An upper insulating member 137 may be installed between the short-circuit tab 131 and the cap plate 125 to electrically insulate the short-circuit tab 131 and the cap plate 125. The short-circuit tab 131 may be electrically connected with the positive electrode terminal 121 via a nut 129. The upper insulating member 137 may be installed to cover the lateral end of the short-circuit tap 131, and may have a hole at a portion corresponding to a short-circuit hole 135 formed on the cap plate 125.

The negative electrode terminal 122 may penetrate the cap plate 125. A connection plate 141 between the cap plate 125 and the negative electrode terminal 122 electrically connect the negative electrode terminal 122 and the cap plate 125. Accordingly, the cap plate 125 and the case 30 are negatively charged. Between the negative electrode terminal 122 and the cap plate 125, a gasket 142 may be insertingly positioned in a hole into which the negative electrode terminal 122 penetrates.

The cap assembly 120 may include a short-circuit member 134 that can short circuit the positive electrode 11 and the negative electrode 12. The short-circuit hole 135 may be formed in the cap plate 125, and the short-circuit member 134 may be disposed at the short-circuit hole 135 between the upper insulating member 137 and the cap plate 125. The short-circuit member 134 may be configured as a reversal plate including an edge portion 134a, formed at the edge thereof and fixed to the cap plate 125, and a curved portion 134b, formed to be convex in an arc shape at an inner side of the edge portion 134a.

In this manner, the short-circuit member 134 is connected with the cap plate 125 which is electrically connected with the negative electrode 12. When the internal pressure of the rechargeable battery 103 increases, the short-circuit member 134 is deformed to be connected to the short-circuit tab 131 electrically connected with the positive electrode 11.

When the short-circuit member 134 is electrically connected to the short-circuit tab 131, a large current instantly flows through the current collecting member 51. At this time, the fuse regions 517 and 518 are melted to cut off an electrical connection between the positive electrode terminal 121 and the electrode assembly 10, as well as an electrical connection between the electrode assemblies 10.

In this manner, by applying both the short-circuit member 134 and the current collecting member including a plurality of fuse regions 517, 518, current can be easily interrupted (or cut off) when the internal pressure of the rechargeable battery 103 is increased, thus further enhancing stability.

Figure 9:
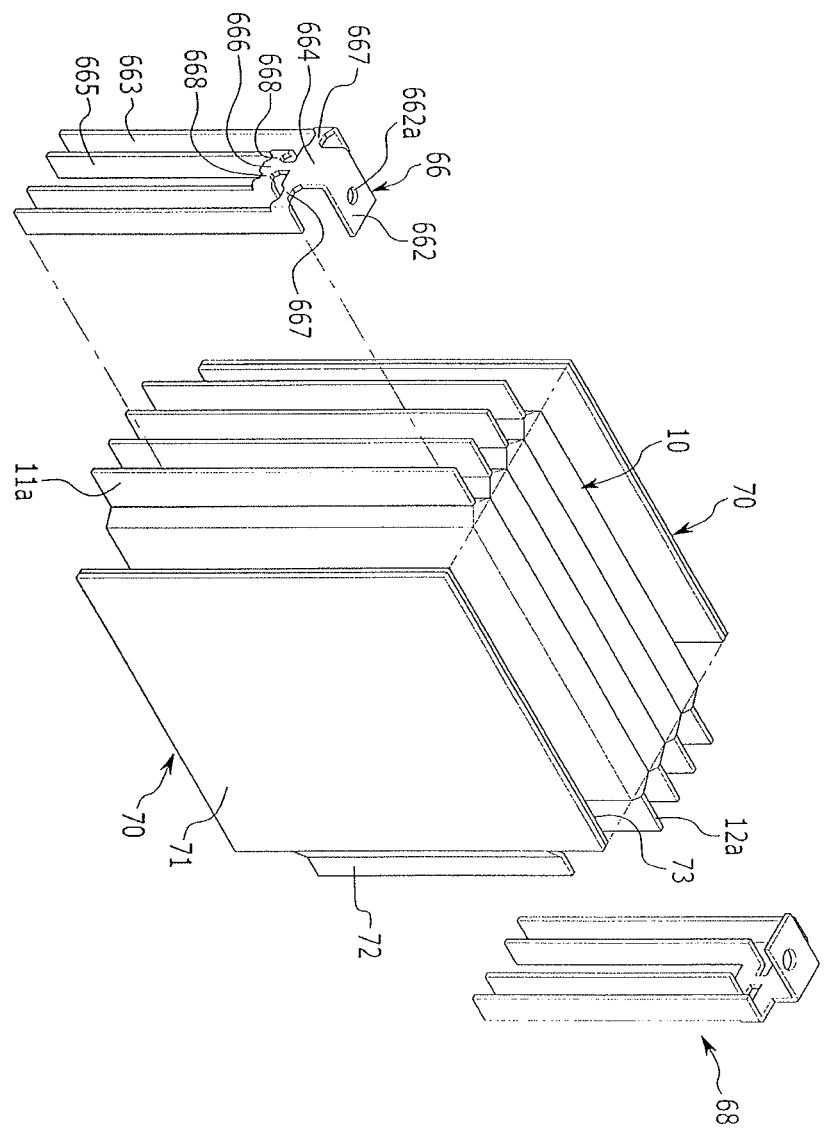
FIG. 9 illustrates a partial exploded perspective view of a rechargeable battery according to a sixth embodiment.
Figure 10:
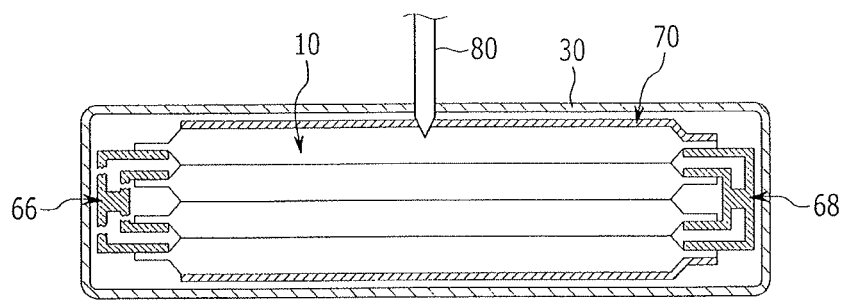
FIG. 10 illustrates a schematic view showing the configuration of the rechargeable battery according to the sixth embodiment.

FIG. 9 illustrates a partial exploded perspective view of a rechargeable battery according to a sixth embodiment. FIG. 10 illustrates a schematic view showing the configuration of the rechargeable battery according to the sixth embodiment.

With reference to FIGS. 9 and 10, a rechargeable battery 104 according to a sixth embodiment is configured to have the same structure as that of the first embodiment, so a description of the same structure will not be repeated.

A current collecting member 66 may be connected to the positive electrode uncoated region 11a through welding. A current collecting member 68 may be connected to the negative electrode uncoated region 12a through welding.

The current collecting member 66 electrically connects the positive electrode 11 and the positive electrode terminal 21. The current collecting member 68 electrically connects the negative electrode 12 and the negative electrode terminal 22.

The current collecting member 66 may include a terminal connection region 662 fixed to the positive electrode terminal 21, a side plate 664 bent from the terminal connection region 662, a current collecting piece 663 fixed to the positive electrode uncoated region 11a, and a fuse region 667 between the side plate 664 and the current collecting piece 663 and having a smaller sectional area than the vicinity.

The current collecting member 68 installed at the negative electrode terminal 22 is configured to have the same structure as that of the current collecting member 66, except for fuse regions 667 and 668, so a description thereof will not be repeated.

The terminal connection region 662 may have a quadrangular plate-like shape and may include a hole 662a at the center thereof, into which the positive electrode terminal 21 is inserted. The terminal connection region 662 may be connected to a lower portion of the positive electrode terminal 21 through welding. The side plate 664 may be bent toward the bottom of the case 30 from the terminal connection region 662 at a right angle so as to be disposed to be parallel to the side of the case 30.

Two current collecting pieces 663 may be connected to both lateral ends of the side plate 664. The fuse region 667 having a smaller sectional area than other portions may be formed between the current collecting pieces 663 and the side plate 664.

According to the present embodiment, the fuse region 667 is formed to have a smaller width than the vicinity. Accordingly, when an overcurrent flows through the current collecting member 66, the fuse region 667 may be melted to cut off an electrical connection between the current collecting piece 663 and the side plate 664. However, the present embodiment is not meant to be limited thereto, e.g., the fuse region 667 may be formed to have a smaller thickness than the vicinity.

A connection region 666 may be formed at a lower portion of the side plate 664, and current collecting pieces 665 may be formed at both lateral ends of the connection region 666 and connected to the positive electrode uncoated region 11a through welding. The fuse region 668 having a smaller sectional area than other portions may be formed between the connection region 666 and the current collecting piece 665.

The fuse region 668 is formed to have a smaller width than the vicinity. Accordingly, when an overcurrent flows through the current collecting member 66, the fuse region 668 is melted to cut off an electrical connection between the connection region 666 and the current collecting piece 665.

In this manner, according to the present embodiment, since the plurality of fuse regions 667 are formed to be connected with the side plate 664, when an overcurrent flows, an electrical connection with the respective current collecting pieces 663 can be cut off. In addition, since the plurality of fuse regions 668 are formed to be connected with the connection region 666, when an overcurrent flows, an electrical connection with the respective current collecting pieces 665 can be cut off.

Safety members 70 electrically connected with the negative electrode 12 may be installed on the electrode assemblies 10 disposed at both lateral ends among the electrode assemblies 10, respectively. The safety members 70 may be connected to the negative electrode uncoated regions 12a of the electrode assemblies 10 disposed at both lateral ends among the electrode assemblies 10 through welding. The safety members 70 may include a metal plate 71 and an insulating film 73 attached to the metal plate 71.

An electrode connection region 72 electrically connected with the negative electrode uncoated region 12a is connected to one lateral end of the metal plate 71. The metal plate 71 is connected with the negative electrode uncoated region 12a at the electrode connection region 72 through welding, and is made of the same material as that of the negative electrode uncoated region 12a so as to be easily welded to the negative electrode uncoated region 12a. The metal plate 71 according to the present embodiment is made of, e.g., copper (Cu) or a copper alloy.

An insulating film 73 may be installed on a portion of the metal plate 71 opposed to a flat front surface of the electrode assembly 10. The insulating film 73 serves to prevent the electrode assembly 10 and the metal plate 71 from being electrically connected. The insulating film 73 may be made of a material that does not react with an electrolyte, e.g., a polymer material.

The electrode connection region 72, in a state of being disposed to be parallel to the negative electrode uncoated region 12a, may be fixed to the negative electrode uncoated region 12a through welding. Accordingly, the electrode connection region 72 serves to prevent the negative electrode uncoated region 12a from wobbling due to an external impact or vibration.

When the current collecting member 68 is connected to the negative electrode uncoated region 12a through welding, if the negative electrode uncoated region 12a wobbles due to an external impact or vibration, contact between the negative electrode uncoated region 12a and the current collecting member 68 deteriorates. However, in the present embodiment, since the electrode connection region 72 supports the negative electrode uncoated region 12a, deterioration of the contact between the negative electrode uncoated region 12a and the current collecting member 68 due to an external impact, vibration, or the like, may be reduced or prevented.

As shown in FIG. 10, when a conductive foreign object 80, e.g., a nail, a gimlet, or the like, infiltrates into the rechargeable battery 104, if the positive electrode 11 and the negative electrode 12 are short-circuited via the conductive foreign object 80, excessive heat would be generated within the rechargeable battery 104, which may cause the rechargeable battery explode or ignite. However, in the present embodiment, since the safety member 70 is installed, the safety member 70 and the positive electrode 11 are short-circuited, discharging the charged current. When the metal plate 71 electrically connected with the negative electrode 12 is short-circuited with the positive electrode 11, a very small amount of heat is generated compared to the case in which the positive electrode 11 and the negative electrode 12 are short-circuited.

In this manner, according to the present embodiment, when a foreign object infiltrates from the outside, potentially causing a short circuit, the current is discharged to reduce or eliminate the risk of ignition, thus enhancing the stability of the rechargeable battery 104.

Also, when a short circuit occurs so an overcurrent flows, the fuse regions 667 and 668 formed at the current collecting member 66 are melted to cut off an electrical connection between the positive electrode terminal 21 and the electrode assemblies 10 and an electrical connection between the electrode assemblies. Accordingly, the stability of the rechargeable battery 104 can be further enhanced. According to an embodiment, when overcurrent flows, the electrode assemblies are electrically cut off, thus improving stability of the rechargeable battery.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery, comprising:
   an electrode assembly including a first electrode and a second electrode;
   a first electrode terminal; and
   a first current collecting member electrically connecting the first electrode terminal and a first electrode uncoated region of the first electrode, the first current collecting member including
   a first terminal connection region,
   a side plate extending downwardly from the first terminal connection region towards the first electrode uncoated region,
   a first current collecting piece coupled with the side plate, the first current collecting piece being in contact with the first electrode uncoated region, and
   a fuse in a region of the first current collecting member that extends between the side plate and the first current collecting piece, the fuse having a smaller sectional area than adjacent portions of the side plate and the first current collecting piece.

2. The battery as claimed in claim 1, wherein the first terminal connection region, the side plate, the first current collecting piece, and the fuse are formed of a same material.

3. The battery as claimed in claim 2, wherein the first terminal connection region, the side plate, the first current collecting piece, and the fuse are integral with one another.

4. The battery as claimed in claim 1, wherein at least two first current collecting pieces extend laterally from the side plate.

5. The battery as claimed in claim 1, further comprising a plurality of electrode assemblies and a corresponding plurality of first current collecting pieces, the fuse including first and second fuse regions between the side plate and two first current collecting pieces of the plurality of first current collecting pieces, respectively.

6. The battery as claimed in claim 5, wherein the first and second fuse regions extend laterally between the side plate and the two first current collecting pieces.

7. The battery as claimed in claim 6, further comprising a third fuse region extending vertically from the side plate, the third fuse region being between the side plate and first current collecting pieces other than the two first current collecting pieces.

8. The battery as claimed in claim 7, wherein the third fuse region contacts a connection region extending laterally between first current collecting pieces other than the two first current collecting pieces.

9. The battery as claimed in claim 6, further comprising connection regions connecting the two first current collecting pieces to adjacent first current collecting pieces, respectively.

10. The battery as claimed in claim 6, further comprising:
a connection region extending vertically from the side plate; and
a third fuse region extending laterally from the connection region, the third fuse region being between the connection region and a third first current collecting piece.

11. The battery as claimed in claim 10, further comprising:
a fourth fuse region extending laterally from the connection region, on a side opposite the third fuse region, the fourth fuse region being between the connection region and a fourth first current collecting piece.

12. The battery as claimed in claim 5, wherein the plurality of first current collecting pieces is two current collecting pieces.

13. The battery as claimed in claim 4, wherein the fuse includes a fuse region is in an electrical path between each current collecting piece and the side plate.

14. The battery as claimed in claim 1, further comprising a short circuit member connected to the first electrode terminal.

15. The battery as claimed in claim 1, wherein the first current collecting piece is welded to the first electrode uncoated region.

16. The battery as claimed in claim 1, further comprising a blocking member made of an electrically insulating material and at least partially surrounding the fuse.

17. The battery as claimed in claim 16, wherein the blocking member includes a base region on a side of the fuse opposite the electrode uncoated region and protrusions between the first terminal connection region and the first current collecting piece.

18. The battery as claimed in claim 1, further comprising:
a second electrode terminal;
a second current collecting member electrically connecting the second electrode terminal and a second electrode uncoated region of the second electrode; and
safety members on lateral sides of the electrode assembly and electrically connected to the second electrode.

19. The battery as claimed in claim 18, wherein each safety member includes:
a conductive plate;
an insulating region separating the conductive plate and the electrode assembly; and
an electrode connection region electrically connecting the conductive plate and the second electrode, wherein the electrode connection region is welded to the second electrode.

* * * * *